(12) United States Patent
Nagaishi

(10) Patent No.: US 10,077,990 B2
(45) Date of Patent: Sep. 18, 2018

(54) FIXATION STRUCTURE AND RESOLVER STATOR

(71) Applicant: TOYOTA JIDOSHA KABUSHIKI KAISHA, Toyota-shi, Aichi-ken (JP)

(72) Inventor: Masakazu Nagaishi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 172 days.

(21) Appl. No.: 14/904,290

(22) PCT Filed: Jul. 7, 2014

(86) PCT No.: PCT/IB2014/001280
§ 371 (c)(1),
(2) Date: Jan. 11, 2016

(87) PCT Pub. No.: WO2015/008123
PCT Pub. Date: Jan. 22, 2015

(65) Prior Publication Data
US 2016/0161290 A1     Jun. 9, 2016

(30) Foreign Application Priority Data

Jul. 17, 2013   (JP) ................... 2013-148370

(51) Int. Cl.
*G01D 5/20* (2006.01)
*H02K 5/00* (2006.01)
*H02K 11/225* (2016.01)

(52) U.S. Cl.
CPC ............... *G01D 5/20* (2013.01); *H02K 5/00* (2013.01); *H02K 11/225* (2016.01)

(58) Field of Classification Search
USPC ............. 324/537, 545, 546, 207.15, 207.13; 310/66, 68 D
See application file for complete search history.

(56) References Cited

U.S. PATENT DOCUMENTS

| 2008/0024021 A1* | 1/2008 | Tsukashima ......... G01D 5/2046 |
| | | 310/68 D |
| 2013/0106252 A1 | 5/2013 | Yanagida |

FOREIGN PATENT DOCUMENTS

| CN | 202510710 U | 10/2012 |
| JP | 62-183119 U | 11/1987 |
| JP | 125766 Y2 | 8/1989 |
| JP | 2007-336714 A | 12/2007 |
| JP | 2013-093983 A | 5/2013 |
| JP | 2013-093984 A | 5/2013 |
| JP | 2013-176265 A | 9/2013 |

OTHER PUBLICATIONS

Partial Translation of JP Office Action dated May 28, 2015 in corresponding JP Patent Application No. 2013-148370.

\* cited by examiner

*Primary Examiner* — Vincent Q Nguyen
(74) *Attorney, Agent, or Firm* — Sughrue Mion, PLLC

(57) ABSTRACT

A knock pin (50) is inserted into a knock hole (54) of an electric motor case (18) to which a resolver stator (30) is fixed. The resolver stator (30) is positioned by engaging the knock pin (50) with an engagement groove (56). The resolver stator (30) includes a stop portion (58) at a position opposed to a rear end of the knock pin (50) in its insertion direction. When the knock pin (50) is about to fall off from the knock hole (54), the stop portion (58) prevents its movement, thereby preventing the falling off.

4 Claims, 4 Drawing Sheets

FIXATION STRUCTURE AND RESOLVER STATOR

BACKGROUND OF THE INVENTION

1. Field of the Invention

The present invention relates to a stator of a resolver, and particularly to a structure for fixing the stator.

2. Description of Related Art

There has been known a resolver configured to detect a rotation position of a rotor, such as a rotor of an electric motor, which rotates around an axis. For example, a resolver provided in an electric motor includes: a resolver rotor that rotates together with a rotor of the electric motor; and a resolver stator disposed around the resolver rotor in a fixing manner with respect to a stator of the electric motor. When a rotation position of the resolver rotor with respect to the resolver stator is detected, it is possible to detect a position of the rotor of the electric motor with respect to the stator.

The resolver stator is fixed to a structure to which the stator of the electric motor is fixed, e.g., a case for the electric motor. A knock pin is usable for positioning of the resolver stator with respect to the case. Japanese Patent Application Publication No. 2013-93983 (JP 2013-93983 A) describes a resolver stator positioned in a case for an electric motor by use of a knock pin.

SUMMARY OF THE INVENTION

The knock pin may fall off from the structure into which the knock pin is inserted. For example, in a case where a device such as an electric motor including a resolver placed therein is provided in a vehicle, a knock pin is easy to fall off due to vibration of the vehicle. Further, in a case where a structure and a knock pin are formed, for example, from materials having different thermal expansion coefficients, the knock pin may be loosened due to a difference in thermal expansion. If a vibration is added in this state, the knock pin is further easy to fall off.

The present invention provides a fixation structure and a resolver stator each of which prevents a knock pin from falling off.

A first aspect of the present invention relates to a fixation structure. The fixation structure includes a reference structure, a resolver stator, and a knock pin. The reference structure has a hole. The resolver stator includes a stator core. The stator core includes an engagement portion. The resolver stator is fixed to the reference structure. The resolver stator includes a stop portion. The knock pin is configured to be inserted into the hole. The knock pin is configured to engage with the engagement portion. The stop portion is opposed to a rear end of the knock pin in an insertion direction of the knock pin so as to prevent the knock pin from falling off.

A resolver stator according to the first aspect of the present invention includes a stator core having an engagement structure engaging with a knock pin; and a stop portion opposed to a position where the knock pin of the engagement structure is placed, so as to prevent the knock pin from falling off.

When the resolver stator is fixed to the reference structure, which is a target object on which the resolver stator is to be provided, the stop portion is opposed to the rear end of the knock pin, that is, the rear end of the knock pin in an insertion direction of the knock pin into the hole (the knock hole) provided in the reference structure. The stop portion regulates a rearward movement of the knock pin, so as to prevent the knock pin from falling off from the knock hole.

In the fixation structure, the resolver stator may include a stator coil and a cover member, the stator coil may be provided on the stator core, the cover member may be configured to cover at least part of the stator coil, and the stop portion may be provided in the cover member.

Since the stop portion is provided, it is possible to prevent the knock pin from falling off.

A second aspect of the present invention relates to a resolver stator fixed to a reference structure having a hole into which a knock pin is insertable. The resolver stator includes a stator core and a stop portion. The stator core includes an engagement portion engaging with the knock pin. The stop portion is opposed to a position where the knock pin is inserted in the engagement portion, so as to prevent the knock pin from falling off.

The resolver stator may include a stator coil and a cover member. The stator coil may be provided on the stator core. The cover member may be configured to cover at least part of the stator coil. The cover member may include the stop portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
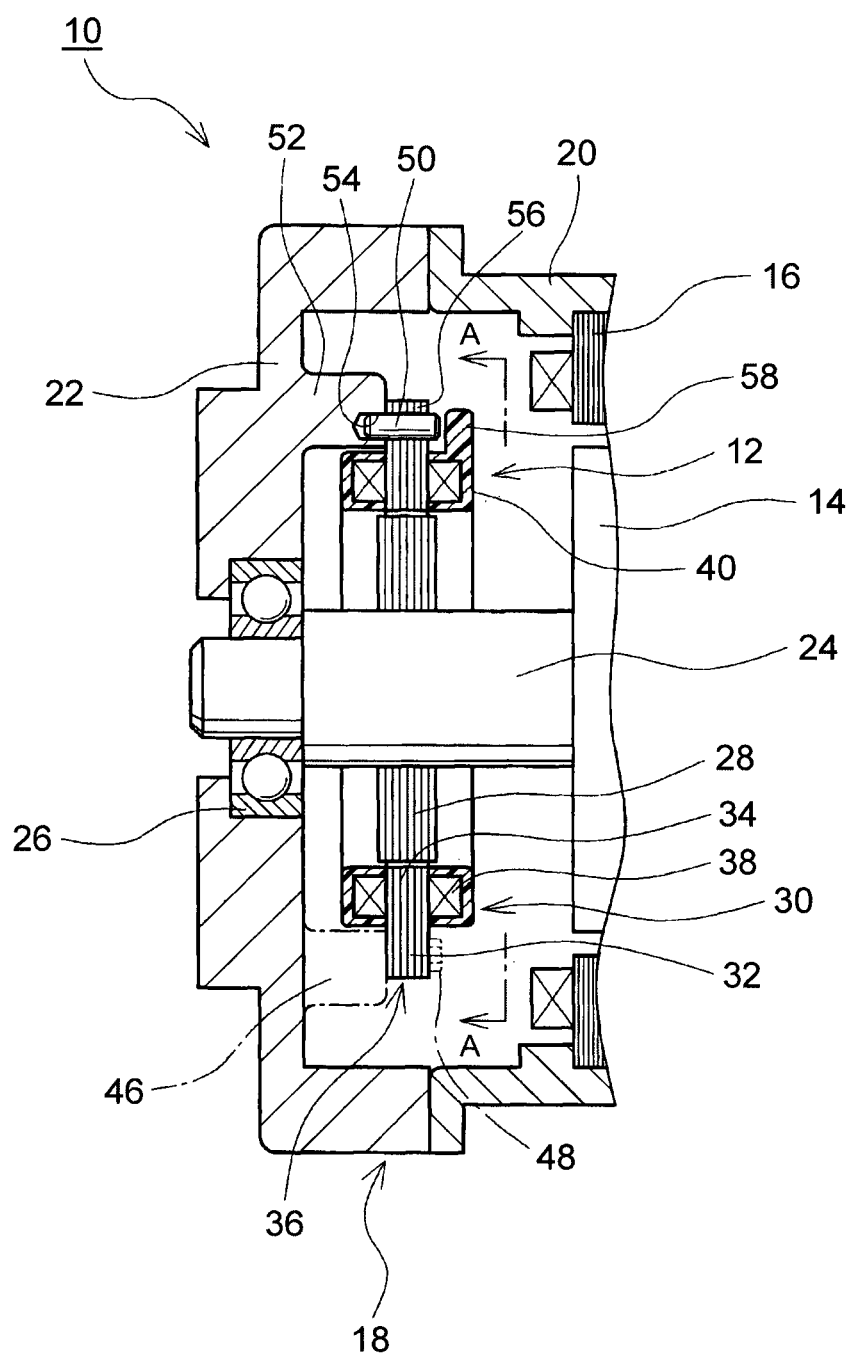
FIG. 1 is a sectional view illustrating a schematic configuration of a resolver according to the present invention and its peripheral area.

An embodiment of the present invention is described below with reference to the drawings. FIG. 1 is a sectional view illustrating a resolver 12 included in an electric motor 10.

The electric motor 10 includes an electric motor rotor 14, and an electric motor stator 16 disposed so as to surround the electric motor rotor 14. The electric motor rotor 14 and the electric motor stator 16 are housed in an electric motor case 18. The electric motor case 18 includes a generally cylindrical case main body 20, and an end case 22 covering one end of the cylindrical shape of the case main body 20 and fixed thereto. An electric motor stator 16 is disposed in a fixing manner on an inner surface of the cylindrical shape of the case main body 20. The electric motor rotor 14 includes a rotor shaft 24, and the rotor shaft 24 is rotatably supported by a bearing 26 provided in the electric motor case 18. In FIG. 1, only one end of the rotor shaft 24 is illustrated, but the other end thereof is also supported rotatably by a bearing.

The resolver 12 includes a resolver rotor 28 fixed to the rotor shaft 24, and a resolver stator 30 fixed to the electric motor case 18, particularly, the end case 22. The resolver rotor 28 has an elliptical plate-like shape, and a center of the ellipse is placed on a rotary axis of the rotor shaft 24. When the rotor shaft 24 rotates, the resolver rotor 28 also rotates integrally. The resolver rotor 28 is formed such that electromagnetic steel sheets are laminated in the rotary axis. The resolver stator 30 has a generally toric shape, and is disposed so as to surround an outer circumference of the resolver rotor 28.

The resolver stator 30 includes a stator core 36 having a toric yoke 32 and teeth 34 extending inwardly from an inner circumference of the yoke 32, and stator coils 38 provided so as to be wound around the teeth 34. The stator core 36 is formed such that electromagnetic steel sheets are laminated in a rotary axis of the resolver rotor 28. A plurality of teeth 34 is arranged on the inner circumference of the yoke 32 along a circumferential direction thereof. The stator coils 38 are at least partially covered with a cover member 40, and particularly, in this embodiment, the stator coils 38 are entirely covered therewith so that the stator coils 38 are not exposed. The cover member 40 is made of resin, and formed by insert molding, for example. That is, the stator core 36 is placed in a molding die in a state where the stator coils 38 are provided thereon, and resin is injected into the molding die so as to mold the cover member 40. In this embodiment, the cover member 40 is formed in a toric shape so as to integrally cover a plurality of stator coils 38 each provided on each of the plurality of teeth 34. Further, the cover member 40 may have a portion 42 covering a terminal for an electric wiring.

The stator coils 38 include three coils, i.e., an excitation coil and two detecting coils. The two detecting coils are provided on the teeth disposed at an interval of 90 degrees in terms of an electrical angle in the electric motor 10. When an alternating current is applied to the excitation coil, a current is induced to the two detecting coils.

When the resolver rotor 28 rotates along with a rotation of the rotor shaft 24, a gap between an outer peripheral surface of the elliptical resolver rotor 28 and tips of the teeth of the stator core 36 changes periodically. Because of this, the current induced into the detecting coils changes periodically. From the change of the current thus flowing in the detecting coils, a rotation position of the resolver rotor 28 relative to the resolver stator 30 is calculated. The resolver stator 30 is fixed to the electric motor case 18, and the resolver rotor 28 rotates integrally with the electric motor rotor 14. Hereby, the resolver 12 detects a rotation position of the electric motor rotor 14 on the basis of the electric motor case 18. Accordingly, in this embodiment, the electric motor case 18 is a structure (a reference structure) serving as a reference for the rotation position of the electric motor rotor 14.

A shape of the resolver rotor 28 is not limited to the above elliptical shape, and may be any shape provided that the shape allows the gap between its outer peripheral surface and the tips of the teeth of the stator core 36 to change periodically along with the rotation. For example, the shape can be a disc-like shape in which a center deviates from a rotation center.

Figure 2:
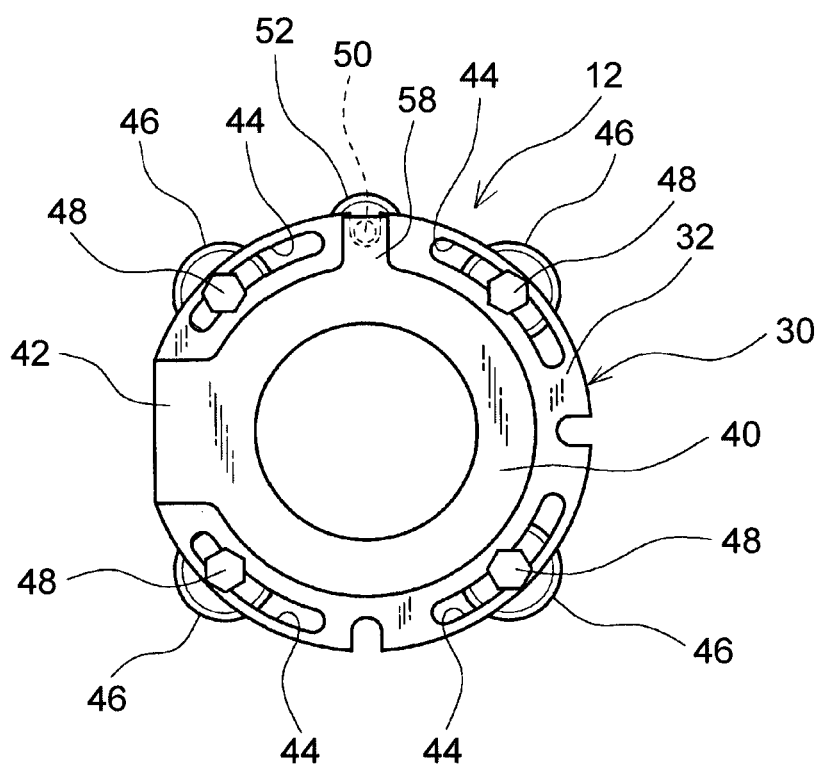
FIG. 2 is a view illustrating a resolver stator and its peripheral area viewed along an arrow A.
Figure 3:
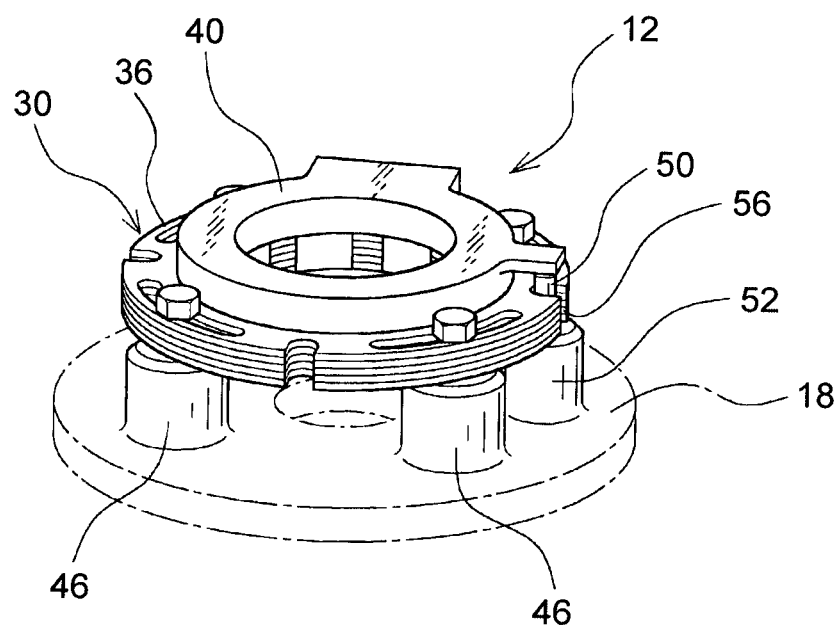
FIG. 3 is a perspective view illustrating the resolver stator and its peripheral area.

FIGS. 2 and 3 are views illustrating a portion where the resolver stator 30 is fixed to the resolver 12 of the electric motor case 18. FIG. 2 is a view illustrating a state where the portion is viewed in a direction of an arrow A illustrated in FIG. 1, and FIG. 3 is a perspective view of the portion. The following description is made with reference to FIGS. 2, 3, as well as FIG. 1.

The yoke 32 of the stator core 36 is provided with elongated slots 44 extending in a circumferential direction. Further, the electric motor case 18 is provided with stator bosses 46. The stator boss 46 is provided with a screw thread hole, and a threaded bolt 48 penetrating through the elongated slot 44 is threadedly connected to the screw thread hole, so that the resolver stator 30 is fixed to the electric motor case 18. Positioning of the resolver stator 30 in a plane perpendicular to the rotary axis of the electric motor rotor 14 is determined by engagements between the threaded bolts 48 and the elongated slots 44. Further, positioning thereof in its circumferential direction is determined by a knock pin 50.

The knock pin 50 is inserted into a knock hole 54 (see FIG. 1) provided in a knock-pin boss 52 provided in the electric motor case 18. The knock pin 50 may be inserted into the knock hole 54 by press fitting. The stator core 36 is provided with an engagement groove (an engagement portion or an engagement structure) 56 to be engaged with the knock pin 50. The engagement groove 56 is a groove extending inwardly from an outer peripheral surface of the stator core 36, and a width thereof can be set to a size that makes a clearance fit with the knock pin 50. The knock pin 50 penetrates through the engagement groove 56, and a rear end (a right end in FIG. 1) thereof in its insertion direction projects from an end face of the stator core 36. Alternatively, the rear end of the knock pin 50 may be placed within the engagement groove 56. A positional relationship between the teeth 34 and the engagement groove 56 provided in the same stator core 36 is fixed, and when the engagement groove 56 engages with the knock pin 50, a positional relationship between the teeth 34 of the resolver 12 and the electric motor stator 16 in the circumferential direction is determined.

The resolver stator 30 includes a stop portion 58 at a position opposed to the rear end of the knock pin 50 when the resolver stator 30 is fixed to the electric motor case 18, and the stop portion 58 prevents the knock pin 50 from falling off. The stop portion 58 is provided so as to extend outwardly in a radial direction from the cover member 40 and to cover at least part of the engagement groove 56. Further, the stop portion 58 may be formed integrally with the cover member 40, or may be attached thereto later. The stop portion 58 may make contact with the rear end of the knock pin 50, or may be opposed thereto via some space. This space is set so that, when the knock pin 50 moves in a direction where the knock pin 50 falls off from the knock hole 54, the knock pin 50 abuts with the stop portion 58 before the knock pin 50 completely falls off from the knock hole 54.

Even if the knock pin 50 is fixed to the knock hole 54 by press fitting, the knock pin 50 may fall off depending on conditions. For example, in a case where the electric motor case 18 is made from aluminum alloy and the knock pin 50 is made from general steel, the knock pin 50 may make a clearance fit due to thermal expansion by heat generation from the electric motor. A thermal expansion coefficient of the aluminum alloy is larger than that of the general steel, and when a temperature increases, an inside diameter of the knock hole 54 expands so as to become larger than an outside diameter of the knock pin 50. In view of this, a fitting size therebetween is changed from a tight fit state to a clearance fit state, so that the knock pin 50 is loosened, which may cause the knock pin 50 to fall off. In a case where the electric motor 10 is provided in a vehicle, the knock pin may be also loosened due to vibration of the vehicle. By providing the stop portion 58 with respect to such falling off of the knock pin 50, it is possible to prevent the knock pin 50 from falling off.

Figure 4:
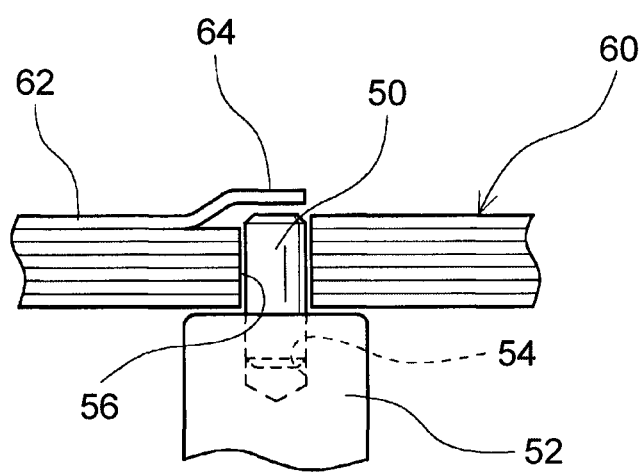
FIG. 4 is a view illustrating another embodiment of a stop portion.

FIG. 4 is a view illustrating an embodiment in which the stop portion is provided in the stator core. FIG. 4 illustrates only a periphery area of the knock pin 50. Similarly to the embodiment illustrated in FIGS. 1 to 3, the knock pin 50 is inserted into the knock hole 54 provided in the knock-pin boss 52. A stator core 60 is formed by laminating electromagnetic steel sheets, and a stop portion 64 is formed in that one (indicated by a reference sign 62) of the electromagnetic steel sheets which is placed on a side opposite to the knock-pin boss 52. The stop portion 64 is provided so as to be opposed to at least part of an opening of the engagement groove 56. When the engagement groove 56 engages with the knock pin 50, the stop portion 64 is opposed to the rear end (an upper end in FIG. 4) of the knock pin in its insertion direction. Further, the stop portion 64 comes off from a plane defined by most part of the electromagnetic steel sheet 62. Further, in a case where a height of the knock pin 50 is lowered, and its rear end in the insertion direction is placed within the engagement groove 56, the stop portion 64 may be placed in the same plane as the electromagnetic steel sheet 62.

The stop portions 58, 64 may be opposed to the rear end of the knock pin 50 so as to overlap with part of the rear end of the knock pin 50, provided that the stop portions 58, 64 can prevent a movement of the knock pin 50. Further, the stop portions 58, 64 may be entirely opposed to the rear end. Furthermore, the engagement groove 56 may employ other structures that allow the engagement groove 56 to engage with the knock pin 50 so as to position the resolver stator 30 in the circumferential direction. The other structures may be, for example, a hole shape.

The invention claimed is:

1. A fixation structure comprising:
    a reference structure having a hole;
    a resolver stator fixed to the reference structure, wherein the resolver stator includes a stator core and a stop portion, and the stator core includes an engagement portion; and
    a knock pin having a front end and a rear end opposite from the front end as viewed in an axial direction of the resolver stator, wherein the front end of the knock pin is disposed in the hole of the reference structure and the knock pin is engaged with the engagement portion of the stator core,
    wherein the stop portion of the resolver stator faces the rear end of the knock pin in the axial direction to prevent the knock pin from falling off the hole of the reference structure.

2. The fixation structure according to claim 1, wherein
    the resolver stator includes a stator coil and a cover member,
    the stator coil is provided on the stator core,
    the cover member is configured to cover at least part of the stator coil, and
    the stop portion extends radially outward from an outer peripheral edge of the cover member, so as to face the rear end of the knock pin.

3. The fixation structure according to claim 1, wherein
    the stop portion is disposed in a position where the knock pin is inserted in the engagement portion, so as to abut the knock pin in a case where the knock pin moves partially out of the hole.

4. The fixation structure according to claim 3, further comprising:
    a stator coil provided on the stator core;
    a cover member configured to cover at least part of the stator coil, the cover member integrally formed with the stop portion.

* * * * *